US012596805B2

(12) United States Patent
Yifrach

(10) Patent No.: US 12,596,805 B2
(45) Date of Patent: Apr. 7, 2026

(54) CYBER-ATTACK DETECTION AND PREVENTION SYSTEM

(71) Applicants:Amichai Chaim Yifrach, Qedumim (IL); Uriel Kosayev, Holon (IL); Eyal Fishman, Petah Tiqwa (IL)

(72) Inventor: Amichai Chaim Yifrach, Qedumim (IL)

( * ) Notice: Subject to any disclaimer, the term of this patent is extended or adjusted under 35 U.S.C. 154(b) by 8 days.

(21) Appl. No.: 18/728,535

(22) PCT Filed: Jul. 28, 2022

(86) PCT No.: PCT/IL2022/050821
§ 371 (c)(1),
(2) Date: Jul. 12, 2024

(87) PCT Pub. No.: WO2023/135591
PCT Pub. Date: Jul. 20, 2023

(65) Prior Publication Data
US 2025/0156545 A1 May 15, 2025

(30) Foreign Application Priority Data
Jan. 13, 2022 (IL) .......................................... 289845

(51) Int. Cl.
*G06F 21/56* (2013.01)
*G06F 21/55* (2013.01)

(52) U.S. Cl.
CPC .......... *G06F 21/566* (2013.01); *G06F 21/554* (2013.01); *G06F 2221/034* (2013.01)

(58) Field of Classification Search
CPC ...... G06F 21/566; G06F 21/554; G06F 21/56; G06F 21/85; G06F 21/78; G06F 2221/034
See application file for complete search history.

(56) References Cited

U.S. PATENT DOCUMENTS 9,117,075 B1 8/2015 Yeh
9,736,179 B2 * 8/2017 Ismael .................. G06F 21/566
(Continued)

FOREIGN PATENT DOCUMENTS

EP      3639504 A2    4/2020
WO   2021080602 A1    4/2021
WO   2021236661 A1   11/2021

OTHER PUBLICATIONS

Dan Meng, Rui Hou, Gang Shi, Bibo Tu, Aimin Yu, Ziyuan Zhu, Xiaoqi Jia, and Peng Liu "Security-First Architecture: Deploying Physically Isolated Active Security Processors for Safeguarding the Future of Computing." Cybersecurity (Singapore) (2018): n. pag. Web. (Year: 2018).*

(Continued)

*Primary Examiner* — Jung W Kim
*Assistant Examiner* — James P Moles
(74) *Attorney, Agent, or Firm* — Millen, White, Zelano & Branigan P.C.; William F. Nixon

(57) ABSTRACT

The present invention relates to a system for protecting against cyber-attacks on a host machine, comprising: (a) at least one MTS, connected to the bus lines, of said memory device(s), of said host, for sampling the electrical signals, intended for said memory device(s); (b) at least one MRMU, connected to said MTS(s), for receiving said sampled signals from said MTS(s) and translating said sampled signals for reconstructing the physical and virtual memory content of said host, into at least one MLM of said host machine; (c) a memory, connected to said MRMU, for storing said at least one MLM; and (d) an IPU, connected to said MRMU(s), and connected to said memory, for detecting, identifying, and analyzing at least one EOI within the reconstructed host memory content, on said memory, and for classifying said at least one EOI as legitimate or malicious.

11 Claims, 1 Drawing Sheet

(56)     References Cited

U.S. PATENT DOCUMENTS

| | | | |
|---|---|---|---|
| 10,728,265 | B2 | 7/2020 | Hayden et al. |
| 10,887,347 | B2 | 1/2021 | Koren et al. |
| 2006/0053260 | A1* | 3/2006 | Kodama ............. G06F 11/1666 |
| | | | 711/165 |
| 2008/0216176 | A1* | 9/2008 | Lomont .................. G06F 21/57 |
| | | | 726/24 |
| 2013/0031629 | A1* | 1/2013 | Srivastava ............ G06F 21/554 |
| | | | 726/22 |
| 2016/0342533 | A1* | 11/2016 | Shan ...................... G06F 21/554 |
| 2018/0150419 | A1* | 5/2018 | Steinmacher-Burow .................... |
| | | | G06F 13/1673 |
| 2018/0367553 | A1* | 12/2018 | Hayden ............... H04L 63/1425 |
| 2019/0108343 | A1* | 4/2019 | Brandwine ............. H04L 63/18 |
| 2019/0354726 | A1* | 11/2019 | Critelli ................ G06F 11/1004 |
| 2022/0391507 | A1* | 12/2022 | Dalton .................. G06F 21/554 |
| 2024/0205258 | A1* | 6/2024 | Fellows .............. H04L 63/1433 |

OTHER PUBLICATIONS

International Search Report PCT/IL2022/050821 dated Nov. 2, 2022 (pp. 1-6).

\* cited by examiner

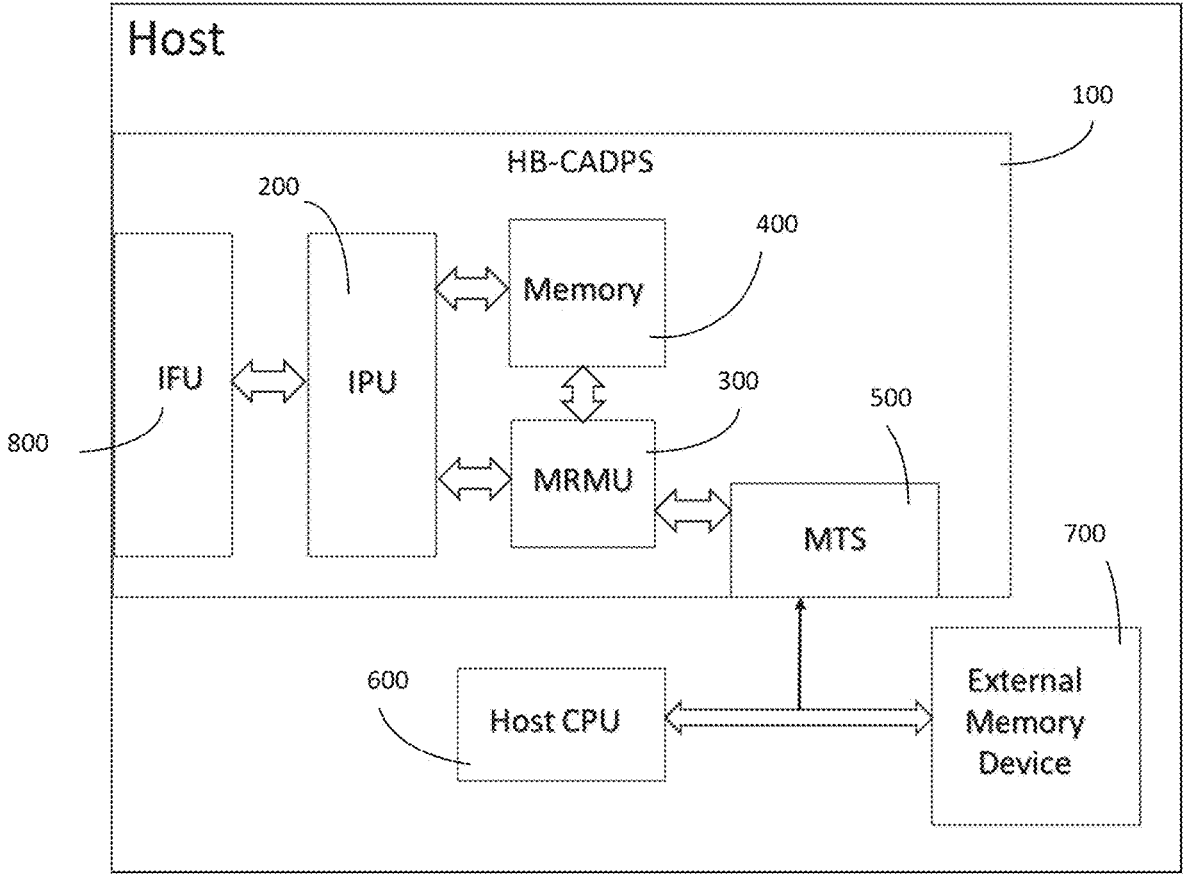

CYBER-ATTACK DETECTION AND PREVENTION SYSTEM

TECHNICAL FIELD

The present invention relates to cyber security. More particularly, to detecting malicious activities within a computer system and protecting the computer system against cyber-attacks.

BACKGROUND

As of today, Cyber-attack on computer systems is an unauthorized actual or potential exploitation, access, or use of a system or data contained in the system. A cyber-attack is also known as a cyber threat, data breach, data security breach, system intrusion, malicious activity, and other similarly purposed terms.

The severity and sophistication of cyber-attacks continue to evolve at an alarming pace, raising questions about users' ability to defend against such attacks. Infrastructures, networks, systems, and even individuals are lucrative targets for malicious attackers who want to steal sensitive data or hold ransom using malware. According to recent studies, it may take the average business more than 6 months to identify a security breach. This prolonged incident response leaves organizations and individuals vulnerable to privacy breach, significant financial and operational losses, along with costly unplanned downtime and diminished productivity.

Conventional Cyber-Attack Detection and Prevention Systems (CADPS) monitor either host computers or network links to detect malicious data or code, which may point to imminent cyber-attack. These systems typically reside inside or as part of the operating system of the protected device and therefore impact the performance of the host machine.

U.S. Pat. No. 10,887,347 discloses a method and system for the perimeter defense of a network. The method comprises receiving, at a system deployed in a perimeter of the network, traffic to or from the network, wherein the network includes a plurality of protection resources; determining, based on the received traffic, at least one potential cyber-attack; and upon determining the at least one potential cyber-attack, causing a mitigation reconfiguration of at least one protection resource of the plurality of protection resources, wherein the mitigation reconfiguration includes reconfiguring each of the at least one protection resource to mitigate the at least one potential cyber-attack. Nevertheless, the described method impacts the performance of the network.

U.S. Pat. No. 9,117,075 discloses a computer network, of an enterprise, which includes a central management computer linking at least one trusted host computer with at least one user computer. The trusted host computer is not used for normal day-to-day activities within the enterprise and may also not be used for reading electronic mail nor for accessing the Internet and downloading Web site content. Antivirus software on the user computer screens for suspect activity or features and, if found, the suspect activity or features are compared to rules database. If a determination of malware cannot be made, then these unresolved activities or features are sent to the central management computer to be compared to the trusted, known activities and features of the trusted computer. The suspect activities may be deemed acceptable if activities are shared amongst a certain number of user computers all configured to perform the same function. A user computer may be compared against itself over time. Nevertheless, the described method requires significant resources.

It would therefore be desired to propose a system void of these deficiencies.

SUMMARY

It is an object of the present invention to provide a Hardware Based CADPS (HB-CADPS) for detecting and preventing cyber-attacks.

It is another object of the present invention to provide a system for detecting cyber-attack footprint within a host machine and preventing its malicious intent.

It is still another object of the present invention to provide a method for protecting against cyber-attacks It is another object of the present invention to provide a method for healing machines that were infected by malware or cyber-attacks.

It is still another object of the present invention to provide a complete unattended, unexploitable CADPS, that monitors the memory of the host machine for detecting and preventing cyber-attacks.

Other objects and advantages of the invention will become apparent as the description proceeds.

The present invention relates to a HB-CADPS system for protecting against cyber-attacks on a host machine, where said host machine has an internal or external memory device(s), comprising: (a) at least one MTS, connected to the bus lines, of said memory device(s), of said host, for sampling the electrical signals, intended for said memory device(s); (b) at least one MRMU, connected to said MTS(s), for receiving said sampled signals from said MTS(s) and translating said sampled signals for reconstructing the physical and virtual memory content of said host, into at least one MLM of said host machine; (c) a memory, connected to said MRMU, for storing said at least one MLM; and (d) an IPU, connected to said MRMU(s), and connected to said memory, for detecting, identifying, and analyzing at least one EOI within the reconstructed host memory content, on said memory, and for classifying said at least one EOI as legitimate or malicious.

Preferably, the HB-CADPS system further comprises an IFU for alerting and preventing the operation of a malicious EOI.

In one embodiment, the IFU is used for networking together several HB-CADPSs to implement complex levels of threat analysis, detection and prevention based on behavioral comparison, Artificial Intelligence, Machine Learning, Deep Learning or any other larger data analysis or reasoning.

In one embodiment, the MTS is connected to the bus lines, of the memory device(s), of the host in parallel.

In one embodiment, the MTS is connected to the bus lines, of the memory device(s), of the host in serial.

In one embodiment, the HB-CADPS system is a stand-alone system.

In one embodiment, the HB-CADPS system is partially or fully embedded in the host machine circuitry.

In one embodiment, the HB-CADPS system is partially or fully embedded in the host machine memory circuitry.

In one embodiment, the HB-CADPS system is partially or fully embedded in the host machine CPU.

In one embodiment, the HB-CADPS system is partially or fully embedded in the host machine internal or external memory chipset.

The present invention further relates to a method for protecting against cyber-attacks on a host machine, where said host machine has an internal or external memory device(s), comprising: (a) providing at least one MTS, connected to the bus lines, of said memory device(s), of said host, for sampling the electrical signals, intended for the said memory device(s); (b) providing at least one MRMU, connected to said MTS(s), for receiving said sampled signals from said MTS(s) and translating said sampled signals for reconstructing the physical and virtual memory content of said host, into at least one MLM of said host machine; (c) providing a memory, connected to said MRMU, for storing said at least one MLM; (d) providing an IPU, connected to said MRMU(s), and connected to said memory; (e) scanning said reconstructed memory content of said host; (f) detecting at least one EOI, in said reconstructed memory content of said host, by identifying and analyzing the structure of said at least one EOI; and (g) monitoring said at least one EOI behavior for suspicious activity; and classifying said at least one EOI as legitimate or malicious.

BRIEF DESCRIPTION OF THE DRAWINGS

The accompanying drawings, and specific references to their details, are herein used, by way of example only, to illustratively describe some of the embodiments of the invention.

In the drawings:

FIG. 1 is a diagram of a Hardware Based Cyber-Attack Detection and Prevention System (HB-CADPS), according to an embodiment of the invention.

DETAILED DESCRIPTION

FIG. 1 is a diagram of a Hardware Based Cyber-Attack Detection and Prevention System (HB-CADPS), according to an embodiment of the invention. The proposed HB-CADPS 100 has, inter alia, its own Integrated Processing Unit (IPU) 200, Memory Reconstruction and Monitoring Unit (MRMU) 300, memory 400, Memory Traffic Sniffer (MTS) 500, and operating system. The proposed HB-CADPS 100 is preferably connected between the host machine's processing unit(s), such as CPU 600, and the host's physical memory device(s), such as memory device 700, in series or in parallel to the host's physical memory bus, such as the bus known as North Bridge, for sniffing the physical memory transactions and reconstructing the host machine physical and virtual memory content and logical firmware/software (FW/SW) stacks inside the HB-CADPS 100. The HB-CADPS 100 can then detect, identify, and analyze digital structures called Entities Of Interest (EOI) within the reconstructed memory content of the host machine. Once identified and analyzed, the proposed HB-CADPS may use method(s) for classification of the EOIs as legitimate or malicious, for preventing the operation of malicious EOIs. For example, the HB-CADPS 100 can scan the reconstructed host machine memory, in memory 400, and detect an EOI by identifying and analyzing a known structure of an EOI. After identifying and analyzing the EOI, the HB-CADPS 100 can monitor the EOI behavior and watch for suspicious activity. If, for example, the EOI opens a connection to a blacklisted C2 Server then the HB-CADPS 100 can classify the EOI as malicious for preventing its operation.

The host machine may be any device containing at least one CPU which uses at least one memory device for its operation. The proposed HB-CADPS can be implemented as a separate device, or it can be integrated, partially or fully, into the host machine hardware and/or into the memory device(s) hardware.

One typical weakness of prior art conventional CADPSs, is that they are implemented in the host's software, and thus may initiate the resource vs. capabilities paradox. The growing complexity and sophistication of cyber-attack techniques enforces CADPS to utilize more and more expensive host machine resources to protect their host machine. The need for increasing utilization of resources may bring a host machine to major decrease in performance thus jeopardizing its main purpose. Most conventional CADPS maintain delicate compromise between their detection and prevention capabilities and the impact they have over the host machine performance. This disadvantage can be exploited during a cyber-attack, for example by a malware, which can cause the installed CADPS to utilize the maximal configured resources before the malicious profile is exposed.

Known examples of such attacks may include one or more of the following techniques: (a) "memory bombing", in which the malware allocates a large amount of memory to itself which enforces the CADPS to surrender from analyzing the malware because of potential bad performance impact. (b) "Offer you have to refuse", in which the malware enforces the CADPS to require more machine time than permitted, to complete the analysis of the malware before the real malicious code is exposed or executed. (c) "Spaghetti code", in which the malware enforces the CADPS to follow basic legitimate operations for a significant number of times along interlacing loops and conditions causing the CADPS to allocate more resources than permissible, to complete the malware analysis, before the malicious intent of the malware is exposed.

Another weakness of prior art conventional CADPSs is the exposure to code borne vulnerabilities. Since conventional prior art CADPSs are part of the operating system, and require the installation and use by any user, one can easily install and analyze a prior art CADPS on his system for the sole purpose of vulnerabilities research. Once the detection verdict algorithm(s) of such a CADPS is learned, it can be manipulated and avoided. This weakness exposes conventional CADPSs to countless software level bypass techniques. For example, a CADPS may detect PowerShell payload that is executed from a .PS1 file, nevertheless the same CADPS can be completely oblivious of the same payload executed directly from memory.

Another weakness of conventional CADPSs is their inherent operation which requires them to be a part of, or rely on, the host machine operating system. This weakness exposes conventional CADPSs to overlook attacks that are partially or completely "invisible" to the operating system. For example, techniques like "Process Hollowing", "Process Doppelganging", and "Transacted Hollowing" uses system calls which enable an attacker to perform malicious modifications over a legitimate process during stages that are unseen by the operating system, causing the operating system to run malicious code in disguise of the original legitimate process. These techniques, or when combined with other techniques, can evade typical conventional CADPSs.

Another example of this weakness exploitation technique are software components called "rootkits". A rootkit is a type of malware designed to give the attacker access to and control over a target host. Rootkits operate near or within the kernel of the operating system, which gives them the ability to hide themselves from many conventional CADPSs and initiate commands to the target host without exposing themselves to the higher operating system layers, which may be monitored by the CADPS. Several conventional methods for fighting the rootkits exist, however, today, there is no method that can guarantee full rootkit detection and removal from the host.

Some known Hardware-based anti-virus/anti-malware systems, in the past, focused on file storage scanning and analysis methods. These systems couldn't avoid the need to have some functionality within the host operating system, thus falling into the above vulnerabilities and weaknesses, and were completely incompetent against fileless cyber-attacks.

As described in relations to FIG. 1 the proposed HB-CADPS 100 comprises, inter alia, its own Integrated Processing Unit (IPU) 200, Memory Reconstruction and Monitoring Unit (MRMU) 300, memory 400, and Memory Traffic Sniffer (MTS) 500. The proposed HB-CADPS 100 is preferably connected to the host's physical memory bus, for sniffing and reconstructing the physical and virtual memory content of the host, in the logical firmware/software (FW/SW) stacks and memory of the HB-CADPS 100, for detecting and preventing the operation of malicious EOIs.

The IPU 200, as depicted in FIG. 1, comprises hardware, firmware and/or software for performing the high-level processing, analysis and other high-level operation in order to detect cyber-attacks against the host machine. The IPU 200 may be implemented using computer, embedded or smart device architecture, which includes at least one CPU and any form of internal and/or external memory. The IPU 200 may control some or all the functionality of the HB-CADPS 100 and may also run the HB-CADPS 100 Operating System and/or Software Stack(s) as described forth. In some examples the IPU may be of a computer architecture solution: x86/64 based CPUs such as: Intel core (such as i3/5/7 celeron), Intel Xeon (such as E5-2600v3), AMD Ryzen (such as 5/7 3600/3700) or EPYC, VIA Nano cores etc. In other embodiments the IPU may be a GPU based solution such as: an AMD Embedded Radeon, NVIDIA RTX embedded, Qualcomm Adreno etc. In some embodiments the IPU may have an embedded architecture such as: ARM Cortex (for example A8/9) from vendors such as NXP i.MX6/5xx, Texs-Instruments, Teledyne, AMD Ryzon/EPYC embedded families etc. In some embodiments the IPU may have a Smart devices architecture such as: Qualcomm Snapdragon SoC, Mediatek Dimensity SoC, Helio SoC, HiSilicon Kirin SoC, Sumsung Exynos SoC, etc.

The MTS 500, as depicted in FIG. 1, may be a hardware piece, or multiple hardware pieces, that are connected in parallel to the bus lines, of the external memory device(s) 700, such as SIMM, DIMM, SO-DIMM, Memory chip, external storage device or any other device used for RAM, ROM, CACHE, Flash, SSD, HDD or other known Memory types, of the host. The term "parallel" is meant to include a connection that allows physical access to the electronic signals running on the bus, connected to the external memory 700 of the host, without interfering or effecting, in any substantial way, the electrical signal(s) intended for the external memory for enabling the host machine to properly operate without any, or neglectable, performance degradations or change. Thus, the MTS 500 can sample, i.e. sniff, the electronic signals running on the bus, connected to the external memory 700 of the host. The MTS 500 may utilize high speed electronics, such as FPGA(s), GPU(s), ASIC(s) or other(s), to sample the electrical signals, intended for the external memory 700, and transmit these signals to the MRMU 300.

In one embodiment the MTS may be connected in serial to the bus lines, of the external memory device(s). The term "serial" is meant to include a connection that is inline of the bus where the MTS is in-line with or part of the bus having the capabilities to intercepting and modifying the signals, intended to the external memory of the host, in addition to the normal parallel capabilities, described in the last paragraph.

In one embodiment, the MTS may also comprise high speed electronics for enabling the production, or the injection, of the signals into the bus, of the External memory, thus actively effecting the signals on the bus. This option can be used to selectively alter the memory content seen by the host machine's CPU when required, as will be described below. In such case a very high-speed switching mechanism may be implemented preventing collision between the host machine signals and the MTS signals.

In one embodiment, the MTS may also include high speed electronics which can transmit sampled signals to the MRMU or receive data from the IPU, using a dedicated separate bus with more, the same, or fewer physical lines than the sniffed bus. To perform this function the MTS may utilize SerDes or any other known very high-speed data transceiver method.

In some embodiments, application of specific MTS configurations may be used to enable sniffing of specific kind of memory bus(s). These configurations may defer in physical connection methods, bus sizes, data transfer protocols, speed, signal realm or other application specific required adaptations etc.

The MRMU 300, as depicted in FIG. 1, is used for translating the signals sniffed by the MTS 500. The signals coming from the MTS 500 are translated to Address and Data Transactions by the MRMU 300, as intended for the external memory 700 of the host. This means that the MRMU 300 can reconstruct the signals, intended for the host memory 700, and can mirror the memory operation of the host. For example, if a memory write operation was performed by the host machine, the MRMU 300 can reconstructed the data and restore the data in a dedicated memory section of the memory 400 of the HB-CADPS, such as the Memory Live Mirror (MLM) section, using the reconstructed address as destination. Since each memory write operation, of the host, is continuously sniffed, the MLM section can be used to continuously contain a perfect mirror of the Host Machine Physical Memory. For example, if a memory read operation was performed by the Host Machine, The MRMU 300 compares the Data Read from the bus lines to the value stored in the MLM to validate the MLM integrity, and, if necessary, alerting the processing layers of the HB-CADPS 100 for any memory discrepancies. The memory read event, address and data may also be reported back to the HB-CADPS's IPU 200 for further processing and analysis as will be described below. The MRMU 300 may be implemented using high speed memory management circuitry, Firmware and/or embedded devices such as GPU(s), ASIC(s) or others.

In one embodiment multiple copies of MLMs may exist in the HD-CADPS to prevent race conditions, increase data integrity coherency, enable parallel processing, facilitate recovery infrastructure, establish pipeline and or timeline functionality or other purposes as required. In one embodiment, the MLM copies may be produced at hardware level by the MRMU and/or by the IPU Memory and/or controlled by the Logical Layer of the HD-CADPS.

In one embodiment, all or some of the MLM(s) may be implemented as complete mirror copy of the Host Machine Physical and Virtual Memory, including empty unused spaces. Thus, a write/read operation to/from the Host Machine Memory can result in write/read operation to the same memory address of the MLM for creating a perfect mirror image of the host machine.

In some embodiments, all or some, of the MLM(s) may be implemented by virtually allocating ad-hoc spaces in the memory in the HB-CADPS according to the write/read host operations. In this implementation, the MRMU may store a pipeline of the write/read operations from the host's Memory bus lines, for example FIFO based, and create clusters of virtually allocated memory according to adjacency algorithm or other algorithm(s), while each cluster may be tagged in one or more Memory Allocation Table(s) (MAL(s)) within specific area of the virtual MLM. Each MAL entry may include the original host memory start address of the cluster, the starting address of the cluster inside the virtual MLM, the size of the cluster and other data, which shall enable coherent reconstruction of the entire host machine memory without the need to allocate a large memory space. In this embodiment, empty unused memory cells will not have a copy in this implementation of virtual MLM.

In some embodiments, all or some, of the MLM(s) may be implemented by reconstructing the host machine virtual memory mapping structures into Hardware/Firmware based circuitry of the MRMU, thus maintaining fast Physical to Virtual memory addressing translation mechanism in the HB-CADPS according to the write/read host operations. In this implementation, the MRMU may store a pipeline of the write/read operations from the host's Memory bus lines and according to the host machine Physical to Virtual memory mapping architecture configure the MRMU dedicated Hardware/Firmware sections to perform as high speed Look Up Tables (LUTs) to be used by the MRMU for all or some of the MLM(s) physical to virtual address translation operation.

In one embodiment, an Interface Unit (IFU), such as IFU 800 depicted in FIG. 1, may also be integrated into the HB-CADPS 100 to interface external systems such as communication networks or devices, external storage devices and so forth. The IFU 800, which may be connected to the IPU 200, may be a hardware piece, or implemented in software, which may be used to relay alerts, notifications, information, or other data between the HB-CADPS 100 and the external world. The IFU 800 may also be used for networking together several HB-CADPSs to implement more complex level of threat analysis, detection and prevention based on behavioral comparison, Artificial Intelligence, Machine Learning, Deep Learning or any other larger data analysis or reasoning methods. In one embodiment, for cyber security reasons, the communication between two HB-CADPSs may be exclusive and not accessible from other external systems. The alerting mechanisms may also be exclusive and not accessible from other systems. In one embodiment, the HB-CADPS may be connected to a dedicated server by hardware encrypted links, where the encryption hardware may be embedded into the IFU 800 communicating through VPN or other secure lines, and push alarms to the IT supervisor of the protected site without direct connection accessibility to the HB-CADPS devices from unknown external devices.

In one embodiment, an Entities Detection and Classification Module(s) (EDCM) may be used for scanning the MLM or one of its copies continuously for finding patterns of known structures. Thus, the EDCM can analyze, identify, and classify each structure according to a set of predetermined algorithms. Each detected and classified structure may then be indexed and tagged as an EOI and may be transferred to the Entities Monitoring and Analysis Module(s) for further monitoring and analysis as described forth. The EDCM may be implemented as software only or may be utilized by integrating specific Hardware, Firmware and/or software Entity Specific EDCM (ESEDCM) in order to speed up the detection and classification process of critical known entities such as Executables, Processes, Drivers, API functions, Virtualization structures etc. this kind of ESEDCMs may be implemented using GPU(s), FPGA(s), ASIC(s), DSP(s) or other Hardware/Firmware circuitry or devices.

For example, a specific ESEDCM may be implemented to detect the virtual memory page tables of the operating system and reconstruct the entire system's virtual memory space, which may be much larger than the host machine physical memory. In a single HB-CADPS there can be one or more EDCMs and none or multiple ESEDCMs in order to optimize and parallelize the entities detection and classification process. One or multiple copies of each entity me be forked or independently created from the EDCM to overcome memory discrepancies, as mentioned above, and enable parallel processing, optimize the HB-CADPS functionality or for any other purposes.

For example, when an executable code is executed by the operating system, it is first loaded into memory. The structures of such executable codes are known and documented for typical operating systems. Once such a structure is detected by the proposed HB-CADPS, it is identified as an EOI of type "Executable" and then it can be "objectized" and marked for further analysis. Further analysis may be monitoring the executable within the memory once it becomes a process. Such a process also resides in memory and has known structure(s) for each operating system. Such structures can be detected by the HB-CADPS and identified as EOI of type "Process". Both "Executable" and "Process" EOIs, as well as other EOI types, such as "System Input Output—SYSIO", "Driver", "Kernel Process" and more, may be monitored over time and method(s) may be applied upon them for classification of the EOIs as legitimate or malicious. For example, one known method of a cyber-attack process begins by injecting malicious code into a benign process. In some cases, such malicious behavior does not operate in distinct and detectable ways within the host machine memory if not identified outside of the operating system. The HB-CADPS can detect such EOI behavior and classify it as malicious or benign according to method(s) or other weighing or decision algorithms.

Each entity detected and classified by the EDCM(s) may be registered to the Entities Monitoring and Analysis Module(s) (EMAM), which can allocate processing and memory resources as required to maintain one or several parallel monitoring and analysis processes per entity as follows:

(a) Entity Timeline record—a timed snapshot of each entity as (and if) it changes over time. Used also to recover entity if infected by malicious event.

(b) Entity Central Analysis Process—a process which feeds the entity's snapshots into one or several analysis engines and integrates their results into single decision using various decision rules or weighing methods. This process utilizes one or several analysis engines such as:

(1) Static engine—detects and marks suspicious structures, signatures or markers inside an entity based on the static snapshots of the entity per snapshot and over time. The static engine may follow a decision tree algorithm to maximize detection and minimize false positives. For instant, if an entity starts as obfuscated or packed Executable and gradually unpacks itself to contain system calls which may indicate on port opening intent, such as calls which were not included in the entity during creation in memory, may point on an abnormal behavior for legitimate Executables and this entity might be marked as suspicious for further deeper analysis. Another example may be in the case of a file being encrypted by ransomware, the EMAM static engine may detect such change over time, alert about it and even recover the infected file from the entity timeline records.

(2) Dynamic Engine—detects and marks suspicious activities inside an entity which may point on malicious intent. This engine may monitor the behavior of an entity over time detecting predetermined suspicious chains of events which may indicate on malicious intent.

(3) Heuristic Engine—this engine may utilize recursive static and dynamic techniques over an entity in order to predict and detect suspicious behavior and the susceptibility of a system towards particular threat/risk using various decision rules or weighing methods. This engine may also utilize disassembly and debugging phase to sandbox any suspicious entity into a dedicated virtualization of its environment and controllably pseudo-execute it independently, and in parallel to the entity's execution on the Host Machine, in order to reveal malicious intents before they are manifested on the Host Machine. This Pseudo-execution may be performed in parallel for every branching of the entity's flow and in much faster clock to speed-up the process.

(4) Resource Usage Analysis Engine—this engine may be activated on entities which were classified as System Resource Entity (SRE) such as hardware drivers, communication buffers, Video Card/GPU, kernel API functions and more. This engine monitors the SRE behavior over time and detects abnormal behavior in comparison to known or historical legitimate behavior of that specific SRE. This engine may use statistical and/or various decision rules or weighing methods to determine and mark suspicious usage of such SRE.

(5) BIOS Integrity Analysis Engine—since the BIOS maintains some of its content on the RAM after system startup, and due to the fact that remote system BIOS update is sometimes allowed, these Entities can be classified accordingly (BIOS Specific Entity BSE) and they can be monitored and followed by dedicated statistical and/or various decision rules or weighing methods to determine and mark suspicious usage of such BSE.

(6) Other engines—since the proposed HB-CADPS is intended to be independent from the Host Machine resources, and since the HB-CADPS theoretically may allocate and dedicate the required system resources, such as CPU time, memory, hardware etc., an entity analysis may need, this option may allow the HB-CADPS to optimize and utilize its capabilities more efficiently.

Thus the proposed HB-CADPS can perform its detection and prevention tasks outside the host machine operating system, and can allocate the required amount of resources, when needed, without impacting the host machine performances, and has access to areas that are not accessible or visible by the host machine (client, server, cloud, mobile) operating system, and the HB-CADPS can detect and prevent malicious EOI activities that don't have any footprint outside of the host machine memory.

By reconstructing the hosts machine physical and virtual memory content, the invention overcomes the related prior art weaknesses and vulnerabilities.

The resource vs capabilities paradox of the related art does not exist in the invention since is uses its own IPU and memory resources, which may be as large as the implementation of the invention. When an EOI starts to show indications of detection and prevention avoidance using the above-described paradox vulnerability, or any other malicious and/or exploitation activity, the proposed HB-CADPS can dynamically transfer and balance its own resources for that EOI without jeopardizing the host machine performance or its own. The analysis phase of an EOI can be prolonged inside the invention long after the EOI stopped or suspended its actions on the host machine thus enabling the detection and prevention of exploitation techniques as described in relations to the prior art. This function may be enabled by the dynamic and heuristic engines as described above.

Code borne vulnerabilities can be avoided by the proposed HB-CADPS since the HB-CADPS resides inside a closed device which has no interface or direct access to its code from outside. Even if an attacker may succeed in reverse engineering the HB-CADPS and may be able to develop a code that may potentially exploit the HB-CADPS, the attacker will not have the opportunity to spread his exploitation code and install it on an online healthy device, due to the fact that there is no direct gateway to the HB-CADPS internals from the networks or from the host machine. Furthermore, such an attempt will be detected by the HB-CADPS, since such an attempt must pass through the host machine memory before becoming a real threat.

Since the HB-CADPS does not need to be a part of or rely on the host machine operating system, cyber-attack detection and prevention avoidance techniques that are based on the ability to hide from the operating system can be detected and prevented by the HB-CADPS since an EOI is detected and prevented by the HB-CADPS from the first moment it appeared in memory, even if it exists in the operating system's blind spots, as described above in relations to the prior art. By following an EOI over time in the HB-CADPS memory, as detailed above, the HB-CADPS can detect and prevent a suspected morphism to the EOI, or chain of event related to that EOI, which may point of an implementation of the above mentioned techniques. In the same way, rootkits are detected and prevented due to the same mechanism even if they are obscured from the host machine operating system.

Another feature of the HB-CADPS is not only the ability to detect changes to EOIs but also the ability to reconstruct damaged EOIs. This feature is particularly important in ransomware attacks in which the attacker encrypts the victim machine files in a way that only he can decrypt it, holding the files as hostages until the ransom it paid. The HB-CADPS can detect the initiation of such file modification, since this kind of operation requires the copy of the content of the file to memory, encrypting it in memory and only then saving it back to the disk. This chain of event can trigger the detection and prevention engine(s) of the proposed HB-CADPS, enabling the HB-CADPS to backup copies of the encrypted files to its internal storage, or to the external storage of the host through its IFU as detailed above.

In one embodiment the described HB-CADPS system may be implemented as a standalone system. In this embodiment, the HB-CADPS system may be bought separately and installed in an existing host machine by connecting the HB-CADPS system to the bus lines, of the memory device(s), of the host machine.

In one embodiment the described HB-CADPS system may be partially, or fully, embedded in the host machine motherboard, or other machine circuitry. In this embodiment, the HB-CADPS system may be embedded partially, or fully, in the host machine motherboard, or other machine circuitry, during manufacturing, or later, and connected to the bus lines, of the memory device(s), of the host machine.

In one embodiment the described HB-CADPS system may be partially, or fully, embedded in the host machine memory circuitry. In this embodiment, the HB-CADPS system may be embedded partially, or fully, in the host machine memory circuitry, during manufacturing, or later, and connected to the bus lines, of the memory device(s).

In one embodiment the described HB-CADPS system may be partially, or fully, embedded in the host machine CPU, or CPU chipset. In this embodiment, the HB-CADPS system may be embedded partially, or fully, in the host machine CPU, or CPU chipset, during manufacturing, or later, and connected to the bus lines intended for communication with a memory device(s).

In one embodiment the described HB-CADPS system may be partially, or fully, embedded in the host machine internal or external memory chipset. In this embodiment, the HB-CADPS system may be embedded partially, or fully, in the host machine internal or external memory chipset, during manufacturing, or later, and connected to the bus lines, of the memory device(s).

While the above description discloses many embodiments and specifications of the invention, these were described by way of illustration and should not be construed as limitations on the scope of the invention. The described invention may be carried into practice with many modifications which are within the scope of the appended claims.

The invention claimed is:

1. A HB-CADPS (Hardware Based Cyber-Attack Detection and Prevention System) for protecting against cyber-attacks on a host machine, where said host machine has an internal or external memory device(s), comprising:

at least one MTS (Memory Traffic Sniffer), connected to the bus lines, of said host memory device(s), of said host, for sampling the electrical signals, intended for said host's physical memory device(s);

at least one MRMU (Memory Reconstruction and Monitoring Unit), connected to said MTS(s), for receiving said sampled signals to address and data transactions from said MTS(s) and translating said sampled signals for reconstructing the physical and virtual memory content of said host, into at least one MLM (Memory Live Mirror) of said host machine;

a memory, connected to said MRMU, for storing said at least one MLM; and an IPU (Integrated Processing Unit), connected to said MRMU(s), and connected to said memory, for detecting, identifying, and analyzing at least one EOI (Entities Of Interest) within said reconstructed host memory content, on said memory, and for classifying said at least one EOI as legitimate or malicious.

2. A system according to claim 1, where the HB-CADPS further comprises an IFU (Interface Unit) for alerting and preventing the operation of a malicious EOI.

3. A system according to claim 2, where the IFU is used for networking together several HB-CADPSs to implement complex levels of threat analysis, detection and prevention based on behavioral comparison, Artificial Intelligence, Machine Learning, Deep Learning or any other larger data analysis or reasoning.

4. A system according to claim 1, where the MTS is connected to the bus lines, of the memory device(s), of the host in parallel.

5. A system according to claim 1, where the MTS is connected to the bus lines, of the memory device(s), of the host in serial.

6. A system according to claim 1, where the HB-CADPS is a standalone system.

7. A system according to claim 1, where the HB-CADPS is partially or fully embedded in the host machine circuitry.

8. A system according to claim 1, where the HB-CADPS is partially or fully embedded in the host machine memory circuitry.

9. A system according to claim 1, where the HB-CADPS is partially or fully embedded in the host machine CPU.

10. A system according to claim 1, where the HB-CADPS is partially or fully embedded in the host machine internal or external memory chipset.

11. A method for protecting against cyber-attacks on a host machine, where said host machine has an internal or external memory device(s), comprising:

providing at least one MTS (Memory Traffic Sniffer), connected to the bus lines, of said memory device(s), of said host, for sampling the electrical signals, intended for the said host's physical memory device(s);

providing at least one MRMU (Memory Reconstruction and Monitoring Unit), connected to said MTS(s), for receiving said sampled signals from said MTS(s) and translating said sampled signals to address and data transactions for reconstructing the physical and virtual memory content of said host, into at least one MLM (Memory Live Mirror) of said host machine;

providing a memory, connected to said MRMU, for storing said at least one MLM;

providing an IPU (Integrated Processing Unit), connected to said MRMU(s), and connected to said memory;

scanning said reconstructed memory content of said host;

detecting at least one EOI (Entities Of Interest), in said reconstructed memory content of said host, by identifying and analyzing the structure of said at least one EOI; and monitoring said at least one EOI behavior for suspicious activity; and classifying said at least one EOI as legitimate or malicious.

* * * * *